United States Patent
Bandi et al.

(10) Patent No.: US 12,049,222 B2
(45) Date of Patent: Jul. 30, 2024

(54) VEHICLE LOCALIZATION

(71) Applicant: Ford Global Technologies, LLC, Dearborn, MI (US)

(72) Inventors: Krishna Bandi, Farmington Hills, MI (US); Samer Ibrahim, Dearborn, MI (US); Colette Knopp, South Lyon, MI (US); Basavaraj Tonshal, Northville, MI (US); Sathyanarayana Chary Palakonda, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 17/547,465

(22) Filed: Dec. 10, 2021

(65) Prior Publication Data
US 2023/0182729 A1    Jun. 15, 2023

(51) Int. Cl.
    B60W 30/12      (2020.01)
    G06F 18/214     (2023.01)
    G06F 18/25      (2023.01)
    H04W 4/40       (2018.01)

(52) U.S. Cl.
    CPC .......... *B60W 30/12* (2013.01); *G06F 18/214* (2023.01); *G06F 18/25* (2023.01); *H04W 4/40* (2018.02); *B60W 2554/4041* (2020.02)

(58) Field of Classification Search
    CPC .......... B60W 30/12; B60W 2554/4041; G01C 21/28; G06F 18/214; G06F 18/25; H04W 4/40; H04W 4/025
    See application file for complete search history.

(56) References Cited

U.S. PATENT DOCUMENTS

| | | |
|---|---|---|
| 10,579,067 B2 | 3/2020 | Rohani et al. |
| 10,953,886 B2 | 3/2021 | Suwabe et al. |
| 2012/0310504 A1 | 12/2012 | DuHadway et al. |
| 2016/0328272 A1 | 11/2016 | Ahmed et al. |
| 2018/0003505 A1 | 1/2018 | Tateishi et al. |
| 2019/0094389 A1 | 3/2019 | Li et al. |
| 2019/0311611 A1 | 10/2019 | Ricci |
| 2021/0247776 A1 | 8/2021 | Faye et al. |
| 2023/0377460 A1 | 11/2023 | Sivanesan et al. |

FOREIGN PATENT DOCUMENTS

| | | | | |
|---|---|---|---|---|
| GB | 2609266 A | * | 2/2023 | .......... B60W 60/001 |
| KR | 1020200119092 A | | 10/2020 | |
| WO | 2015103374 A1 | | 7/2015 | |
| WO | 2021226062 A1 | | 11/2021 | |

OTHER PUBLICATIONS

Non-Final Office Action dated Sep. 27, 2023 re U.S. Appl. No. 17/547,485, filed Dec. 10, 2021.
Final Office Action dated Mar. 19, 2024 re U.S. Appl. No. 17/547,485, filed Dec. 10, 2021.
Notice of Allowance dated May 29, 2024 re U.S. Appl. No. 17/547,485, filed Dec. 10, 2021.

\* cited by examiner

*Primary Examiner* — Calvin Cheung
(74) *Attorney, Agent, or Firm* — Christopher Storms; Bejin Bieneman PLC

(57) ABSTRACT

A plurality of localization data sources accessible on a vehicle network in a vehicle can be identified. A plurality of active vehicle applications that request localization data provided by one or more of the localization data sources can be identified. Based on the active vehicle applications, a plurality of the localization data sources to be combined to output a vehicle location can be selected.

18 Claims, 5 Drawing Sheets

VEHICLE LOCALIZATION

BACKGROUND

The ability of a vehicle computer to localize the vehicle can be important to operating the vehicle. Localizing the vehicle (i.e., performing localization) means identifying a location of the vehicle with respect to a coordinate system. For example, the coordinate system could be a global coordinate system providing latitude and longitude coordinates for the planet earth and/or could be a local coordinate system provided with reference to a vehicle, a specified geographic area, etc. Further, a vehicle could be localized with respect to various types of coordinate systems, e.g., a two-dimensional or three-dimensional Cartesian coordinate system, a polar coordinate system, etc. Various subsystems, services, or features in a vehicle can use localization data.

DETAILED DESCRIPTION

Figure 1:
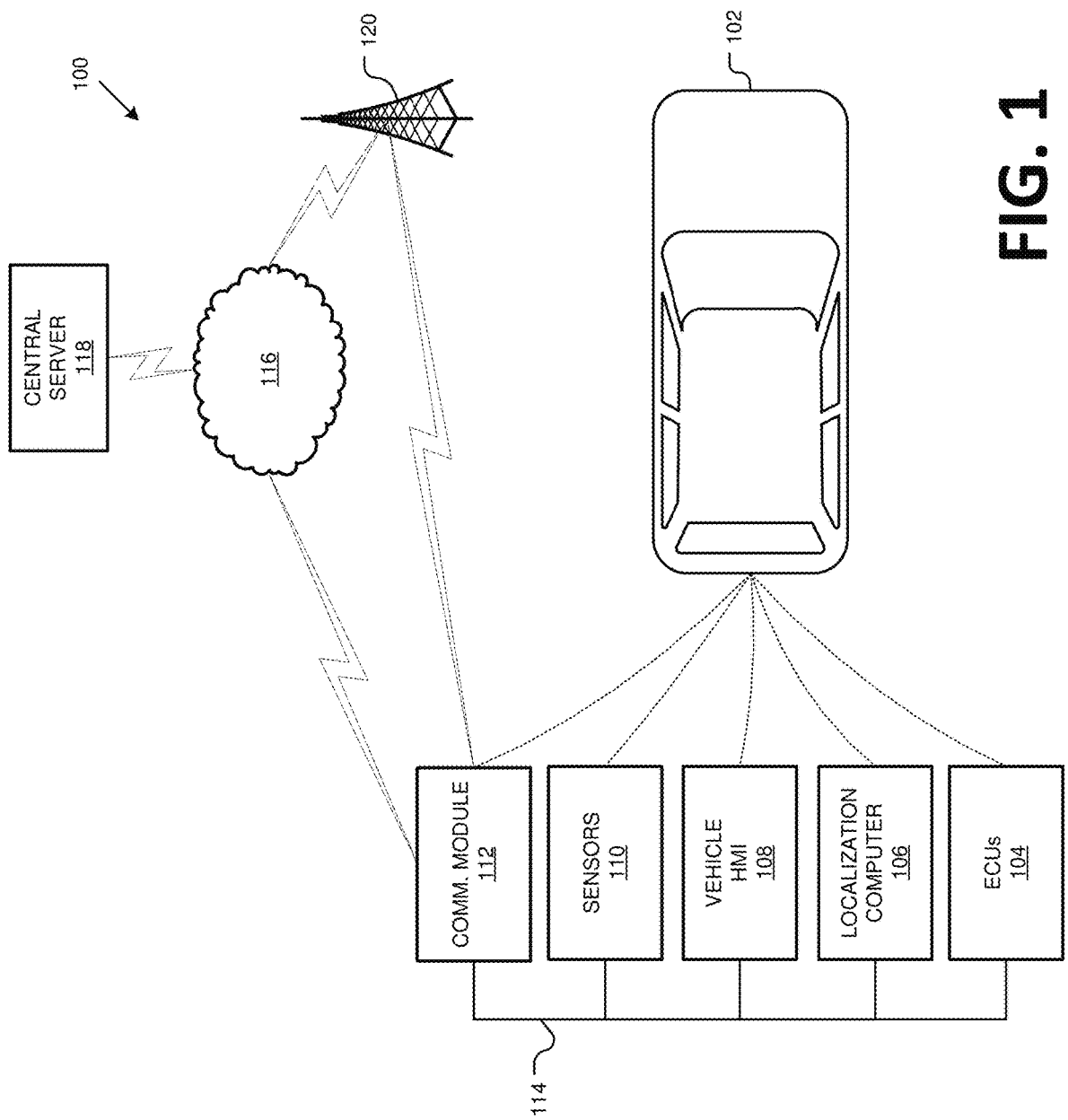
FIG. 1 illustrates an example vehicle operation system.
Figure 2:
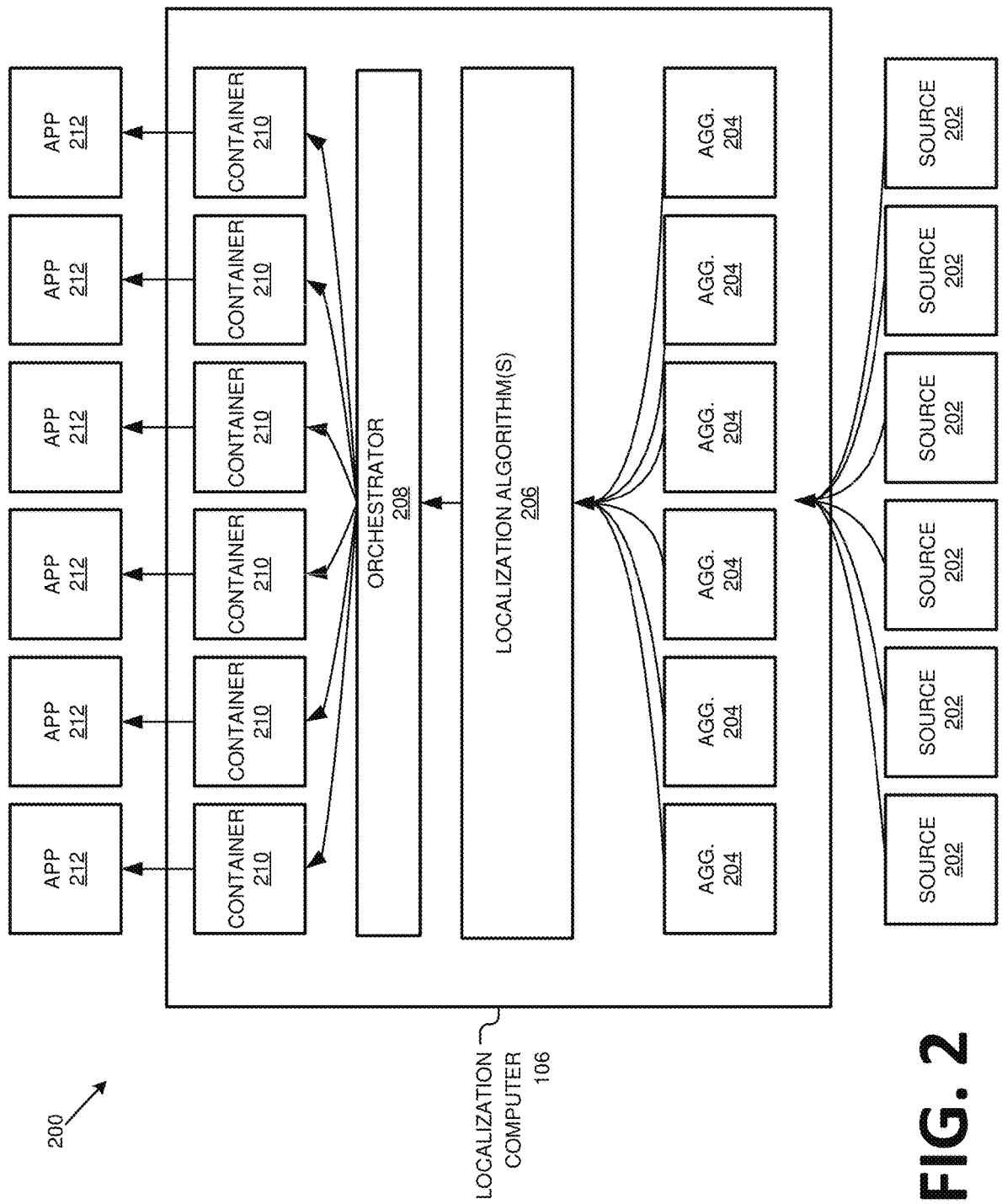
FIG. 2 illustrates an example vehicle localization subsystem.
Figure 3:
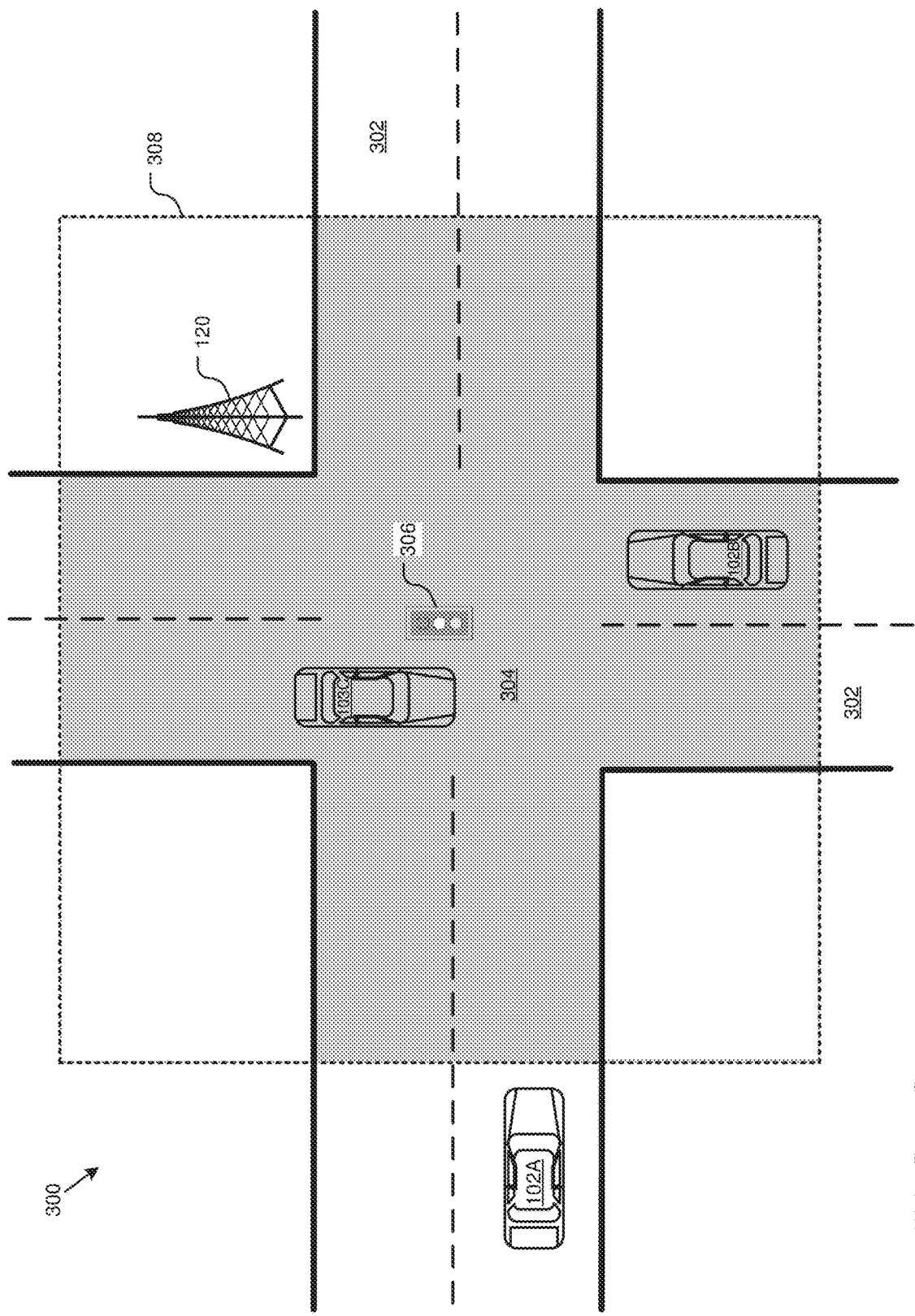
FIG. 3 illustrates and example traffic scene.

Referring to FIGS. 1-3, a vehicle 102 operations system 100 includes at least a vehicle 102 that uses localization data in various vehicle 102 applications 212, e.g., executed by various vehicle 102 electronic control units or ECUs 104. The applications 212 could include a vehicle 102 human machine interface HMI 108, an Emergency Electronic Brake Light (EEBL) subsystem, Green Light Optimal Speed Advisory (GLOSA), Global Location Number (GLN), cruise control, lane-keeping assistant, path planning, a toll payment, traffic light 306 information, parking, electric vehicle 102 charging, and collision avoidance, just to name some. Different applications 212 may need localization data at various times and/or locations, e.g., as illustrated in FIG. 3, when near or at an intersection 304 of two or more roads 302. According to techniques disclosed herein, localization data can be provided to various applications 212 with an improved efficiency of utilizing computing resources in a vehicle 102, including processing, memory, and network resources that can provide localization data with less processing, less memory, and less bandwidth consumption.

The localization data for applications 212 can be provided from, or based on or derived from, data from various sources, such as one or more sensors 110 in the vehicle 102, a central server 118, a roadside infrastructure unit or RSU 120, other vehicles 102, etc. Various applications 212 in the vehicle 102 can request localization data at a same time. Further, the applications 212 can have various priorities. Advantageously, based on priorities and other factors such as confidence and quality of service, a localization computer 106 in a vehicle 102 can instantiate and dynamically provide containers 210 that can provide localization data to various applications 212.

The system 100 and techniques described herein thus advantageously provide localization data to one or more applications 212, including simultaneously, with increased computing efficiency and efficient allocation of computing resources in a vehicle 102, including resources within the localization computer 106 as well as in various ECUs 104.

For example, as explained further below, an orchestrator 208 in the localization subsystem 200 can instantiate containers 210 that provide localization data to applications 212. One container can provide localization data to one or more applications 212. Providing localization data from one container 210 to multiple applications 212 is an example of increased computational and/or network efficiency that could be achieved.

Accordingly, the present disclosure includes a system for a vehicle, comprising: a network interface connectable to a vehicle network; and a processor and a memory, the memory storing instructions executable by the processor, including instructions to: identify a plurality of localization data sources accessible on the vehicle network; identify a plurality of active vehicle applications that request localization data provided by one or more of the localization data sources; and select, based on the active vehicle applications, a plurality of the localization data sources to be combined to output a vehicle location.

Respective ones of the localization data sources can belong to one of a plurality of types of localization data sources. The types of localization data sources can include two or more of map data, V2X data, vehicle sensor data, or vehicle location data. The instructions can further include instructions to combine the localization data according to the types of localization data sources. The instructions can include instructions to perform a data fusion procedure that receives the combined localization data as input and that outputs the vehicle location.

The instructions to select one or more of the localization data sources can include selecting the localization data sources output from a machine learning program that receives as input identifiers for (a) the localization data sources accessible on the vehicle network, and (b) the active applications that request the localization data. The machine learning program can be trained with previously collected localization data from the localization data sources.

The instructions can further include instructions to perform an initialization routine upon an ignition-ON signal on the vehicle network, wherein the initialization routine includes compiling instructions to allow the system to request and receive data from the selected localization data sources. The instructions can further include instructions to identify a minimum number of localization data sources needed for the initialization routine.

The instructions can further include instructions to assign an application priority to respective active vehicle applications based on a vehicle operation that utilizes the respective active vehicle application. The instructions can further include instructions to assign data source priorities to respective localization data sources based on the application priority or priorities of one or more active vehicle applications requiring the respective localization data source.

The active vehicle applications can include at least one of a vehicle human-machine interface (HMI), an Emergency Electronic Brake Light (EEBL), Green Light Optimal Speed Advisory (GLOSA), Global Location Number (GLN), cruise control, lane-keeping assistant, path planning, a toll payment, traffic light information, parking, electric vehicle charging, or collision avoidance.

The instructions can further include instructions to provide an identification of at least one of the active vehicle applications to a human machine interface (HMI) in the vehicle.

A method can comprise identifying a plurality of localization data sources accessible on a vehicle network in a vehicle; identifying a plurality of active vehicle applications that request localization data provided by one or more of the localization data sources; and selecting, based on the active vehicle applications, a plurality of the localization data sources to be combined to output a vehicle location.

Respective ones of the localization data sources can belong to one of a plurality of types of localization data sources. The types of localization data sources include two or more of map data, V2X data, vehicle sensor data, or vehicle location data. The localization data can be combined according to the types of localization data sources.

A data fusion procedure can be performed that receives the combined localization data as input and that outputs the vehicle location.

An application priority can be assigned to respective active vehicle applications based on a vehicle operation that utilizes the respective active vehicle application. Assigning data source priorities to respective localization data sources can be done based on the application priority or priorities of one or more active vehicle applications requiring the respective localization data source.

Referring now to FIGS. 1-2, a system 100 for a vehicle 102 can include a plurality of computing devices, including electronic controllers such as one or more ECUs 104 (electronic control units) or the like, for example. One of the computing devices in the vehicle 102, referred to herein separately for convenience as the localization computer 106, may be an ECU, for example. The localization computer 106 can include, or be connected to a network interface that is connectable to a vehicle network 114. As illustrated in FIG. 2, the localization computer 106 can implement a provide localization subsystem 200 to provide localization data to various applications 212 in the vehicle 102, e.g., to various features or operations implemented in or carried out by vehicle ECUs 104.

The instructions stored and executable by the localization computer 106 can include instructions to identify a plurality of localization data sources 202 accessible on the vehicle network 114; identify a plurality of active vehicle applications 212 that request localization data provided by one or more of the localization data sources 202; select, based on the active vehicle applications 212, a plurality of the localization data sources 202 to be combined to output a vehicle 102 location.

Alternatively or additionally, the instructions stored and executable by the localization computer 106 can include instructions to receive and/or detect a trigger, i.e., data that, when received or detected, indicates that some action is to be taken, to provide localization data to a first vehicle 102 application 212 that is one of a plurality of vehicle 102 applications 212 that receive the localization data; based on the trigger, allocate resources, in one or both of the processor or the memory, to a first data container 210 that provides the localization data in a first format specified for the application 212, and that is one of a plurality of data containers 210 included in the system 100; and provide the localization data in the first format to the first vehicle 102 application 212 upon receiving a location request from the application 212.

Localization data in the context of this document means (a) data that measures or indicates a position, location, and/or pose of a vehicle 102 or some other object according to some coordinate system 100 and/or relative to some other object, and (b) data about a physical state of a vehicle 102. For example, localization data could include a vehicle 102 location, i.e., vehicle 102 location data, e.g., specifying geo-coordinates or the like for a current vehicle 102 location. Localization data could also include a distance of a vehicle 102 from some object, such as another vehicle 102, an intersection 304, a building, etc. Localization data could also include data about the pose of the vehicle 102 or some other object, i.e., an orientation of the vehicle 102 with respect to horizontal and/or vertical axes. The "physical state" of the vehicle 102 means a measurement or setting of the vehicle 102 describing or governing vehicle 102 movement. For example, a physical state of the vehicle 102 could include a vehicle 102 speed, acceleration, turn (or yaw) rate and/or heading, without limitation. A physical state of the vehicle 102 could further include settings such as a transmission setting (park, drive, reverse, etc.), a steering wheel angle, a state of engagement, e.g., brakes engaged or not engaged, etc. Further, references herein to a "location" of a vehicle 102 or some other object mean a place or position on a surface of the earth occupied by the object. A location can be specified according to a global coordinate system 100, e.g., geo-coordinates used by a Global Navigation Satellite System (GNSS), for example, sometimes referred to as GPS coordinates. A location could alternatively be specified relative to some other object, e.g., as a distance and/or heading with respect to the other object.

The vehicle 102 can include, in addition to one or more computing devices, e.g., the localization computer 106 and a plurality of ECUs 104, a human-machine interface, e.g., HMI 108, a plurality of sensors 110, and a communication module 112 to provide communications via a wide area network 116 to other vehicles 102 and/or one or more central computers. ECUs 104 can receive data from various of the sensors 110 and/or computing devices in the vehicle 102, including localization data from the localization computer 106, to support operation of various vehicle 102 features or subsystems. Alternatively or additionally, ECUs 104 in a vehicle 102 can utilize data received from outside the vehicle 102 to operate a vehicle subsystem, e.g., from a central computer and/or one or more other vehicles 102.

A vehicle 102 may be any suitable type of ground vehicle 102, e.g., a passenger or commercial automobile such as a sedan, a coupe, a truck, a sport utility, a crossover, a van, a minivan, a taxi, a bus, etc.

Vehicle 102 computing devices can include a plurality of computers as mentioned above, such as ECUs 104 and a localization computer 106 mentioned above. A vehicle 102 computer includes a processor and a memory. The memory includes one or more forms of computer readable media, and stores instructions executable by the vehicle 102 computer for performing various operations, including as disclosed herein. For example, a vehicle 102 computer can be a generic computer with a processor and memory as described above and/or may include an ECU 104 or controller for a specific function or set of functions, and/or a dedicated electronic circuit including an ASIC that is manufactured for a particular operation, e.g., an ASIC for processing sensor 110 data and/or communicating the sensor 110 data. In another example, a vehicle 102 computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data output from the sensors 110. The memory can be a separate device from the computer, and the computer can retrieve information stored by the memory via a network in the vehicle 102, e.g., over a CAN bus, a wireless network, etc. Alternatively or additionally, the memory can be part of a computer, e.g., as a memory of an ECU 104 or the like.

A computer such as an ECU 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, a computer may be programmed to determine whether and when a human operator is to control such operations.

A computer including the localization computer 106 and ECUs 104 may include or be communicatively coupled to, e.g., via a vehicle network 114 such as a communications bus as described further below, more than one processor, e.g., included in components such as sensors 110, other ECUs 104 or the like included in the vehicle 102 for monitoring and/or controlling various vehicle components, e.g., a powertrain controller, a brake controller, a steering controller, etc. Vehicle 102 computing devices are generally arranged for communications on a vehicle 102 communication network that can include a bus in the vehicle 102 such as a controller area network CAN or the like, and/or other wired and/or wireless mechanisms. Alternatively or additionally, in cases where a computer actually comprises a plurality of devices, e.g., as is possible concerning the localization computer 106 (described herein as implemented as one computing device for convenience), the vehicle 102 communication network may be used for communications between devices represented as one computing device in this document. Further, as mentioned below, various controllers and/or sensors 110 may provide data to vehicle 102 computing devices via the vehicle 102 communication network.

As mentioned above, a vehicle 102 can include an HMI 108, e.g., one or more of a display, a touchscreen display, a microphone, a speaker, etc. The user can provide input to devices such as the computer via the HMI 108. The HMI 108 can communicate with a vehicle 102 computing device via the vehicle network 114, e.g., the HMI 108 can send a message including the user input provided via a touchscreen, microphone, a camera that captures a gesture, etc., to a computer, and/or can display output, e.g., via a screen, speaker, etc.

Vehicles 102, such as autonomous or semi-autonomous vehicles 102, typically include a variety of sensors 110. A sensor 110 is a device that can obtain one or more measurements of one or more physical phenomena. Some sensors 110 detect internal states of the vehicle 102, for example, wheel speed, wheel orientation, and engine and transmission variables. Some sensors 110 detect the position or orientation of the vehicle 102, for example, global positioning system 100 (GPS) or Global Navigation Satellite System 100 (GNSS) sensors 110; accelerometers such as piezoelectric or microelectromechanical systems 100 MEMS; gyroscopes such as rate, ring laser, or fiber-optic gyroscopes; inertial measurements units IMU; and magnetometers. Some sensors 110 detect the external world, for example, radar sensors 110, scanning laser range finders, light detection and ranging LIDAR devices, and image processing sensors 110 such as cameras. A LIDAR device for example detects distances to objects by emitting laser pulses and measuring the time of flight for the pulse to travel to the object and back. Some sensors 110 are communications devices, for example, vehicle-to-infrastructure V2I or vehicle-to-vehicle V2V devices. Sensor 110 operation can be affected by obstructions, e.g., dust, snow, insects, etc. Often, but not necessarily, a sensor 110 includes a digital-to-analog converter to converted sensed analog data to a digital signal that can be provided to a digital computer, e.g., via a network.

Sensors 110 can include a variety of devices, and can be disposed to sense and environment, provide data about a machine, etc., in a variety of ways. For example, a sensor 110 could be mounted to a stationary infrastructure element on, over, or near a road 302, and sensor 110 data could be wirelessly and in real-time or near real-time provided to a vehicle 102 via a central computer or other mechanisms. Moreover, various ECUs 104 in a vehicle 102 may operate as sensors 110 to provide data via the vehicle network 114 or bus, e.g., data relating to vehicle 102 speed, acceleration, location, subsystem and/or component status, etc. Further, other sensors 110, in or on a vehicle 102, stationary infrastructure element, etc., infrastructure could include cameras, short range radar, long range radar, LIDAR, and/or ultrasonic transducers, weight sensors 110, accelerometers, motion detectors, etc., i.e., sensors 110 to provide a variety of data. To provide just a few non-limiting examples, sensor 110 data could include data for determining a position of a component, a location of an object, a speed of an object, a type of an object, a slope of a roadway, a temperature, an presence or amount of moisture, a fuel level, a data rate, etc.

The computer 106 and/or ECUs 104 may be configured for communicating via a vehicle 102 to vehicle 102 communication module 112 or interface with devices outside of the vehicle 102, e.g., through vehicle 102 to vehicle 102 V2V, vehicle-to-infrastructure or everything V2X or vehicle-to-everything including cellular communications C-V2X wireless communications cellular, DSRC., etc. to another vehicle 102, to an infrastructure element typically via direct radio frequency communications and/or typically via the network a remote server. The module could include one or more mechanisms by which the computers of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications (DSRC), cellular V2X (CV2X), and the like.

The vehicle network 114 is a digital network via which messages can be exchanged between various devices in vehicle 102. Computer can be generally programmed to send and/or receive, via vehicle network 114, messages to and/or from other devices in vehicle 102 e.g., any or all of ECUs 104, sensors 110, actuators, components, communications module, a human machine interface HMI 108, etc. Additionally or alternatively, messages can be exchanged among various such other devices in vehicle 102 via vehicle network 114.

In some implementations, vehicle network 114 can be a network in which messages are conveyed via a vehicle 102 communications bus. For example, vehicle network 114 can include a controller area network CAN in which messages are conveyed via a CAN bus, or a local interconnect network LIN in which messages are conveyed via a LIN bus. In some implementations, vehicle network 114 can include a network in which messages are conveyed using other wired communication technologies and/or wireless communication technologies e.g., Ethernet, WiFi, Bluetooth, etc. Additional examples of protocols that may be used for communications over vehicle network 114 in some implementations include, without limitation, Media Oriented System Transport (MOST), Time-Triggered Protocol TTP, and FlexRay.

In some implementations, vehicle network 114 can represent a combination of multiple networks, possibly of different types, that support communications among devices in vehicle 102. For example, vehicle network 114 can include a CAN in which some devices in vehicle 102 communicate via a CAN bus, and a wired or wireless local area network in which some device in vehicle 102 communicate according to Ethernet or Wi-Fi communication protocols.

A computer can be programmed to communicate with one or more remote sites such as aa central server 118, via a wide area network 116. The wide area network 116 can include one or more mechanisms by which a vehicle 102 computer may communicate with, for example, a remote central server 118, one or more RSU's 120, etc. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X CV2X, Dedicated Short Range Communications DSRC, etc., local area networks LAN and/or wide area networks 116 WAN, including the Internet, providing data communication services.

The central server 118 is a computing device such as explained above that is external to vehicles 102. The system 100 could include a plurality of central servers 118. For example, the central server 118 could be geographically remote, e.g., in a data center. Alternatively or additionally, a central server 118 could be included in or communicatively coupled to, one or more roadside infrastructure units, i.e., RSU's 120 or the like to process and/or provide data from sensors included on an RSU 120. Further, although not shown to avoid a needlessly complicated illustration, an RSU 120 can include, in addition to a computing device with a processor and a memory, and one or more sensors 110, a communication interface to provide for wireless communications with vehicles 102, central servers 118, and/or other RSU's 120, e.g., according to Bluetooth, IEEE 802.11, V2V, V2X, CV2X communications, etc.

FIG. 2 illustrates a localization subsystem 200 that can be included in a vehicle 102. As illustrated, the localization computer 106 can receive input from a plurality of respective localization data sources 202. For example, data from one or more localization data sources 202 can be provided to one or more localization data aggregators 204 included in the localization computer 106. The aggregators 204 can each receive as input localization data from one or more of the data sources 202, and can then aggregate or combined the data to be provided to one or more data analyzers included in the localization computer 106 106. The analyzers in turn can provide output to a confidence estimator and/or one or more data containers 210. The respective data containers 210 provide localization data in respective formats specified for one or more vehicle 102 applications 212.

Respective ones of the localization data sources 202 belong to one of a plurality of types of localization data sources 202. A type of a localization data source 202, i.e., a type of localization data, means a form of the localization data and/or a medium by which it is obtained. Examples of types of localization data include map data; external data, e.g., from an RSU 120; sensor 110 data including GPS sensor 110 data, speed data, inertial tracker data, ultrasound data, radar data, lidar data, and/or optical camera data; location correction data; location coordinate data; and/or vehicle communication network data, etc.

Map data in the present context is data stored in a memory accessible by the localization computer 106 and/or ECUs 104 in the vehicle 102. Map data may include data specifying a feature corresponding to a location, e.g., specifying road 302 edges or boundaries 308, lanes, etc., such that the computer can determine whether a location coordinate is on a road 302 surface, shoulder etc. Map data further can include data specifying landmarks such as buildings, parks, bridges, etc., and their respective locations. Map data is typically available from various providers, such as Google LLC, Apple Inc., HERE International B.V., etc.

External localization data is localization data obtained in a vehicle ECU 104 and/or the localization computer 106 from a localization data source 202 external to the vehicle 102. External localization data is typically obtained wirelessly, e.g., through some form of V2X communications. For example, external localization data could be received from an RSU 120 via a V2X interface included in the communication module 112, such as a so-called PC5 interface. As mentioned above, an RSU 120 could provide data from sensors associated with the RSU 120. An RSU 120 could also provide data about its location, data about a strength of a signal received from a vehicle 102, etc. In another example, external localization data could include Signal Phase and Timing (SPaT) data.

Vehicle 102 sensor 110 data, as explained above, could include data from a variety of types of sensors 110 (i.e., sensors 110 obtaining data via various sensing media) included in the vehicle 102. For example, vehicle 102 sensor 110 data could be image data from an imaging device such as an optical camera, a lidar, a radar, etc. Image data can be used to determine localization data about one or more objects in a field or fields of view of a vehicle 102 sensor 110 or sensors 110. For example, image data can be used to determine a distance of an object from a vehicle 102, a pose of an object (e.g., a three-dimensional pose gives an orientation with six degrees of freedom), a direction or coordinates of the object with respect to the vehicle 102, etc. As will be understood, various techniques could be employed for interpreting and/or fusing one or more sets or types of image data from vehicle 102 sensors 110.

Location correction data is data about a distance of a vehicle 102 from a stationary object with a specified location that computing device such as a localization computer 106 can use to adjust or correct, e.g., render more granularly than otherwise possible, location data such as GPS coordinate data. Examples of location correction data include real-time kinematic (RTK) positioning data, ultra-wideband (UWB) data, Bluetooth low energy (BLE) data, RF (radio frequency) positioning data, data according to Radio Technical Commission for Maritime (RTCM) protocol, and the like, that use techniques such as time of flight to determine a distance of a vehicle 102 from a stationary object or marker with known coordinates, and to then correct or adjust a location of the vehicle 102 specified by GPS data, for example.

A further example of a type of localization data source 202 is vehicle network 114 data. For example, data available on a vehicle network 114 such as wheel speed data, odometry data, steering angle data, etc., can be used to determine a vehicle 102 location, typically in conjunction with other localization data.

Aggregators 204 include programming to receive data from one or more data sources 202, typically of a same type, and to then apply data fusion techniques to the received data, i.e., to combine the localization data according to the types of localization data, i.e., an aggregator 204 combines localization data of a same type. For example, for data from vehicle 102 sensors 110, an aggregator 204 could include programming implementing any suitable algorithm for fusing data from the different sensors 110. For example, the aggregator 204 could receive data from cameras, lidar, and radar that could be used for vehicle 102 localization, e.g., to identify a distance of a vehicle 102 from an object, a location of the vehicle 102 on a roadway, etc. An aggregator 204 can thus output various localization data to one or more localization algorithms 206.

For example, an aggregator 204 could output a classification of an object and a position of the object relative to a vehicle 102, a location of the vehicle 102, an identifier of a road 302 on which a vehicle 102 is traveling, an identifier of a road 302 lane on which a vehicle 102 is traveling, etc. While it is expected that various techniques for fusing or aggregating localization data may be developed in the future, it will be understood that various existing techniques could be used. For example, a machine learning program such as a deep neural network (DNN) could be trained to accept as input data from various sources of a same type, e.g., from sensor 110 data sources 202, and to combine or use the data from these different sources to output one or more localization data. To take another example, a machine learning program could be trained to accept as input localization data from vehicle 102 V2X message sources to output one or more localization data. Thus, an aggregator 204 can include program instructions to select one or more localization data sources 202 including selecting the localization data sources 202 output from a machine learning program that receives as input identifiers for (a) the localization data sources 202 accessible on the vehicle network 114, and (b) the active applications 212 that request the localization data. Such a machine learning program could be trained with previously collected localization data from the localization data sources 202.

Further examples of aggregators 204, the types of data they could aggregate, and the data that could be output by the aggregator 204, are shown in Table 1.

TABLE 1

| Aggregator | Input Examples | Output examples |
| --- | --- | --- |
| Sensor data | Radar, lidar, visible light camera | Distance to object(s) in X-direction<br>Distance to object(s) in Y-direction<br>Distance to object(s) in Z-direction<br>Multiple object classifications<br>Multiple object classification in x-direction<br>Multiple object classification in y-direction<br>Multiple object classification in z-direction |
| Map data | Maps from various providers, e.g., Google, TomTom, HERE, Apple, etc. | Data about road and/or lane attributes, e.g., geo-coordinates of feature, boundaries, etc. |
| V2X message data | MAP, SPaT, TIM, RTCM, WSA, SSM, BSM, EVA, BSM, EVA, PSM (see Appendix for further explanation of V2X messages) | Identification of object(s) at specified coordinates. |
| Location correction data | UWB, RTK, BLE RTCM, RF positioning data | Corrections to GNSS and/or RTCL positions and/or other positioning corrections. |
| Location data | GPS sensor data | Geo-coordinates |
| CAN data | Wheel speed, steering angle | Revolutions per minute, degrees |

A localization algorithm 206 can combine output from aggregators 204, and can determine what localization data output is to be stored in a memory of the localization computer 106 to be available for one or more containers 210. Further, the localization algorithm 206 includes programming to determine one or more containers 210 to be instantiated to receive localization data.

The localization computer 106 can include one or more localization algorithms 206, and includes at least a primary localization algorithm 206 that is typically instantiated in the localization computer 106 when a vehicle 102 ignition transitions from an OFF state to an ON state. The primary localization algorithm 206 includes programming such as may be included in a so-called boot-loader or bootstrap program that detects an operating system 100 of the localization computer 106 and then dynamically compiles program instructions for the one or more localization algorithms 206. Further, the primary localization algorithm 206 and/or localization algorithms 206 dedicated to respective applications 212 can include programming to determine when localization data may be requested for respective applications 212, to instantiate containers 210 accordingly, and to deactivate or place in a sleep mode (i.e., de-instantiate), containers 210 when they are not needed.

One or more localization algorithms 206 can receive data from one or more, and often two or more, aggregators 204. Thus, the types of localization data sources 202 provided to output a location of a vehicle 102 can include two or more of map data, V2X data, vehicle 102 sensor 110 data, or vehicle 102 localization data. A localization algorithm 206 receives localization data from a plurality of aggregators 204 fusing data for respective data source 202 types, and outputs, to an orchestrator 208, further localization data that is a result of fusing the localization data from the plurality of aggregators 204. That is, a localization algorithm 206 can perform a data fusion procedure that receives the combined localization data as input and that outputs the vehicle 102 location and/or other localization data.

For example, a localization algorithm 206 can output an estimation and/or a prediction of a future path and/or trajectory of a vehicle 102. A future path of a vehicle 102 means a projection of one or more locations of a vehicle 102 at one or more future moment in time. A future trajectory of a vehicle 102 means the future path and further includes data concerning the vehicle 102 speed and possibly also its heading at the moment in time. A path estimation (or estimated path) of a vehicle 102 means a future path that is determined based on a current vehicle 102 path (i.e., a path of a vehicle 102 up to a current moment in time from a predetermined past moment in time, e.g., 30 seconds ago, 60 seconds ago, etc.). A path prediction (or predicted path) of a vehicle 102 means a future path that is determined based on a path history of the vehicle 102, i.e., based on a history of vehicle 102 maneuvers on previously-driven paths similar to a current path. Similarly, trajectory estimations and predictions can be included in localization data. Various existing techniques for estimating and/or predicting paths could be used, and/or techniques could be developed in the future.

The localization subsystem 200 further typically includes, in a localization algorithm 206, programming to determine a confidence in localization data and to determine, based at least in part on a determined confidence, whether to provide localization data to the orchestrator 208 for provision to one or more containers 210. As mentioned above, a localization algorithm 206 can, e.g., based on data received via the vehicle network 114, determine that one or more applications 212 needs (or could need) certain localization data. The localization algorithm 206 can then determine whether the data can be obtained from one or more aggregators 204 and provided to the orchestrator 208 with a requisite level of confidence, i.e., confidence above a certain threshold, e.g., on a scale of zero to one, or expressed as a percentage, for the application or applications 212. In addition to determining a confidence in localization data, and algorithm module can also determine a quality of service (QoS) level for one or more localization data. A QoS level can include metrics such as packet loss, bit rate, throughput, transmission delay, availability, jitter, etc. Various existing techniques for determining confidence and/or QoS levels could be used, and/or techniques could be developed in the future. For example techniques to estimate or predict a path could include dead reckoning techniques including Kalman filtering, dynamic data reconciliation, extended Kalman filtering etc. Examples of techniques to determine QoS levels include use of scheduling, traffic shaping, admission control, and resource reservation algorithms, etc.

A localization algorithm 206 can further include programming to determine a localization level for data requested by an application 212. In the context of this document, a localization level is a specification of granularity or specificity of a geographic area that localization data it describes. In one example, a localization level can either be lane-level or road-level. For example, the localization algorithm 206 could retrieve data, e.g., in the form of a lookup table or the like, stored in a memory accessible by the localization computer 106 specifying, for respective applications 212, whether localization data is needed at a lane-level or a road-level. For example, a Traffic Light 306 Information (TLI) application 212 could need road-level localization data, such as a road 302 segment identifier, a lane segment identifier, connected intersection 304 attributes (i.e., whether in intersection 304 includes an RSU 120 providing data via V2X communications), traffic signal attributes (e.g., signal phase and timing (SPAT) data), etc.

In one example implementation, a machine learning program can be trained to determine whether values for confidence level and QoS are satisfactory for respective applications 212. For example, the machine learning program could be trained with input from data acquired while operating a vehicle 102, and labeling the data according to whether the data was satisfactory for one or more respective applications 212. Table 2 below provides an example of applications 212, confidence and QoS outputs, and whether the localization data could then be provided to the respective application 212, i.e., "passed."

TABLE 2

| Application | Confidence | QoS | Passed? |
| --- | --- | --- | --- |
| HMI Display | ~99% | 10/10 | Yes |
| Emergency Electronic Brake Light (EEBL) | ~50% | 3/10 | No |
| Green Light Optimal Speed Advisory (GLOSA) | ~75% | 8/10 | Yes |
| Global Location Number (GLN) | ~75% | 8/10 | Yes |
| Cruise control | ~99% | 9.9/10 | Yes |
| Lane-keeping assistant | ~95% | 2/10 | No |
| Path planning | ~99% | 9.9/10 | Yes |
| Toll payment | ~95% | 3/10 | No |
| Traffic Light Information (TLI) | ~95% | 5/10 | No |
| Parking manager | ~98% | 9.8/10 | Yes |
| Electric vehicle charging manager | ~99% | 9.9/10 | Yes |
| Collision avoidance (warning) | ~95% | 9.5/10 | Yes |

The orchestrator 208 can receive localization data from one or more aggregators 204. The orchestrator 208 could be implemented with various available platforms available for building, deploying, and managing containers 210, including Docker Engine offered by Docker, Inc., of Palo Alto, California, USA; Kubernetes, described at the time of filing at Kubernetes.io; Fargate offered by Amazon Web Services, Inc., described to the time of filing at https://aws.amazon.com/fargate; or OpenShift, offered by Red Hat, Inc., of Raleigh, North Carolina, described at the time of filing at https://www.redhat.com/en/technologies/cloud-computing/openshift. Based on the fused localization data provided by one or more aggregators 204, the orchestrator 208 can determine to instantiate one or more containers 210 to support localization data requests from one or more applications 212 in a vehicle 102. The orchestrator 208 includes programming to perform an initialization routine upon an ignition-ON signal on the vehicle network 114, wherein the initialization routine includes compiling instructions to allow the orchestrator 208 to request and receive data from the selected localization data sources 202. The instructions can be compiled based on a detected instruction set of the localization computer 106, e.g., X86-64 (implemented by Advanced Micro Devices of Santa Clara, California, USA, and Intel Corp. of Santa Clara, California, USA), Arm CPU (sold by Arm Limited, of Cambridge, United Kingdom), etc. In some implementations, program instructions included in the orchestrator 208 include instructions to identify a minimum number of localization data sources 202 needed for the initialization routine.

The orchestrator 208 can receive or detect a trigger to provide localization data to one or more vehicle 102 applications 212, and can then instantiate one or more containers 210 to provide the localization data. A trigger in this context is data that the orchestrator 208 is programmed to recognize as an indication that a specific application 212 should receive localization data. One example of a trigger is a request for the application 212 to receive the localization data, e.g., sent from the application 212 executing on a vehicle ECU 104 to the localization computer 106. The ECU 104, connected to the vehicle network 114, via a network interface could include programming to execute an application 212, including instructions to generate the trigger when localization data is warranted for the application 212. The ECU 104 could further be programmed to execute the application 212 further including instructions to provide output based on an absence of the trigger. [**WHEN?]

Another example of a trigger could be a location of a vehicle 102. For example, geo-coordinates indicated by a GPS sensor 110 could be compared to stored map data, and the localization computer 106 could execute instructions to determine whether the geo-coordinates indicate that the vehicle 102 is within a distance of a landmark or the like indicated by map data and further associated with a need or likely need of an application 212 for localization data. For example, if a vehicle 102 is determined to be within a specified distance, e.g. half a kilometer, of an intersection 304 with a traffic light 306, the orchestrator 208 could execute programming to instantiate or activate a container 210 to provide localization data to a TLI application 212. In another example, if a vehicle 102 is determined to be within a specified distance, e.g. half a kilometer, of an intersection 304 with a traffic light 306, the orchestrator 208 could execute programming to instantiate or activate a container 210 to provide localization data to a toll payment application 212. As described further below, the localization computer 106 could store, or could access, e.g., from stored map data, a boundary 308 or boundaries 308 that could be used to provide a trigger for an application 212 to receive localization data, e.g., the trigger could occur when the vehicle 102 was within a distance of, or was at or passing, a boundary 308, e.g., when the vehicle 102 was within a distance of a boundary 308 specified for an intersection 304 of roads 302.

The orchestrator 208 can, and typically does, receive instructions to provide localization data to more than one application 212 at a time. Accordingly, the orchestrator 208 can further include program instructions to receive a first trigger to provide localization data to a first vehicle 102 application 212, and also receive a second trigger to provide localization data at a same time to a second vehicle 102 application 212 that is one of the plurality of vehicle 102 applications 212 that receive the localization data. Based on the second trigger, the orchestrator 208 can further allocate the resources in the localization subsystem 200, e.g., in the localization computer 106, including at least in one of the processor or the memory, to a second data container 210 that provides the localization data in a second format specified for the second vehicle 102 application 212, and that is one of a plurality of data containers 210 included in the system 100. Then the second container 210 can provide the localization data in the second format to the second vehicle 102 application 212 upon receiving a location request from the second application 212.

The vehicle 102 applications 212, as mentioned above, include various respective sets of program instructions, e.g., disposed in various vehicle 102 ECUs 104. Some vehicle 102 applications 212 may provide information via the vehicle 102 HMI 108, whereas other vehicle 102 applications 212 additionally or alternatively may provide data to an ECU 104 to control vehicle 102 operation, e.g., one or more of braking, propulsion, or steering. Examples of vehicle applications 212 include an Emergency Electronic Brake Light (EEBL) subsystem, Green Light Optimal Speed Advisory (GLOSA), Global Location Number (GLN), cruise control, lane-keeping assistant, path planning, a toll payment, traffic light 306 information, parking, electric vehicle 102 charging, and collision avoidance, just to name some. Moreover, the localization computer 106 could include programming to provide an identification of at least one of the active vehicle 102 applications 212 to a human machine interface (HMI) in the vehicle 102, and further additionally the HMI 108 could accept user input specifying a priority or priorities of an application 212 or applications 212.

Once a container 210 has been instantiated or activated, i.e., the orchestrator 208 has allocates resources for the container 210 such as processing capacity and memory after receiving a trigger, the application 212 or applications 212 for which the container 210 has been made active can request localization data (i.e., can make a "location request"). In some implementations, in determining to respond to a localization request, the orchestrator 208 can take into account a quality of service and/or a confidence level specified for an requesting application 212. For example, if a quality of service and/or confidence level do not meet or exceed respective quality of service or confidence level thresholds, the orchestrator 208 or a container 210 may execute programming not to reply to the location request or to reply to the location request with a message specifying that data is unavailable and/or does not meet one or more thresholds. Further, wherein location request cannot be fulfilled because of quality of service and/or confidence levels, the orchestrator 208 can further include instructions to store a record of the location request and typically also a reason or reasons indicating why the location request was not fulfilled in an electronic ledger such as a block chain. The electronic ledger can include a node in a vehicle 102 or typically a plurality of vehicles 102, as well as in one or more central servers 118 to allow for analysis of instances in which localization requests could not be fulfilled. That is, the electronic ledger can be a distributed electronic ledger, e.g., blockchain, shared between the localization subsystem 200 and at least one second computing device such as the central server 118.

The orchestrator 208, via respective containers 210, can provide localization data to applications 212 including specific localization data and/or in a specific format for a respective application 212. In one example, a container 210 could be provided to provide specific localization data in a specific format, and could be accessed by a plurality of applications 212 that utilize the localization data and the specific format.

The orchestrator 208 can thus store and access the localization data and a format of the localization data provided to the vehicle 102 application 212. Further, the orchestrator 208 can store the localization data and an identifier of a first data container 210 that provides the localization data in a specified format. Format in this context means a number of data provided, and type and or a range of possible values for each datum. Example formats of localization data that could be provided from a container 210 are shown in Table 3:

TABLE 3

| Localization Datum/Data | Format | Sample Datum/Data |
|---|---|---|
| Vehicle speed | Integer specifying MPH | 50 |
| Geo-coordinates | Latitude, longitude pair | 42.332939, −83.047836 |

TABLE 3-continued

| Localization Datum/Data | Format | Sample Datum/Data |
|---|---|---|
| Road level attributes | | |
| Lane level attributes | | |
| Distance from object (could be in X, Y, and/or Z directions) | Decimal number in meters | 10.45 |
| Classification of object | Object identifier, e.g., an integer | 3 (specifying another vehicle, for example) |
| GNSS Correction | Decimal in meters | 0.010 |
| RTCM Correction | Decimal in meters | 0.014 | tion, yaw, or distance from an object outside the vehicle 102. Alternatively or additionally, a priority can be determined based on a current state of an application 212, e.g., active, meaning the application is currently being used, or passive, meaning that the application is in a standby mode or available for use but not being used currently. Yet further alternatively or additionally, respective priorities for certain applications 212 can be static, e.g., stored in a memory accessible by the computer 106, and assigned for the application 212 regardless of vehicle location and/or physical state. Table 4 below provides an example of determining priorities for applications 212. The "Dynamic Updater" column gives examples of applications 212 whose priorities can or cannot be dynamically updated, including two examples of applications 212 whose ability for dynamic updating can change based on vehicle location and/or physical state(s).

TABLE 4

| Application | Priorities(Low, Medium, High) | Current State (Active, Passive) | Priority Severity Dynamic Updater (Yes, No) |
|---|---|---|---|
| HMI Display | High | Active | Yes |
| Emergency Electronic Brake Light (EEBL) | Medium | Passive | No |
| Green Light Optimal Speed Advisory (GLOSA) | Low | Passive | No |
| Green Light Notification (GLN) | Low | Passive | No |
| Cruise control | Medium | Passive | No |
| Lane-keeping assistant | High | Passive | No |
| Path planning | Medium | Active | Yes |
| Toll payment | Low | Active | Yes -> No |
| Traffic Light Information (TLI) | Medium | Passive | No |
| Parking manager | Medium | Passive | No |
| Electric vehicle charging manager | Medium | Passive | No |
| Collision avoidance (warning) | High | Passive | No -> Yes - (e.g.,, when collision avoidance needs resource allocations) |

As mentioned above, the orchestrator 208 may prioritize various applications 212 for which containers 210 can be provided. For example, an application 212 priority can be assigned to respective active vehicle applications 212 based on a vehicle 102 operation that utilizes the active vehicle application 212. Further, the orchestrator 208 can include instructions to assign data source 202 priorities to respective localization data sources 202 based on the application 212 priority or priorities of one or more active vehicle applications 212 requiring the respective localization data source 202. Data about priorities assigned to respective applications 212 could be stored in a lookup table or the like included in or otherwise accessible by the localization computer 106, for example.

Accordingly, the orchestrator 208 can allocate the resources in the system 100, e.g., in the localization computer 106, at least in part by comparing a priority of the first application 212 to a priority of the second application 212. For example, a priority between a first application 212 and a second application 212, and hence allocation of resources between first and second containers 210 for the respective applications 212, can be determined by a vehicle 102 location and/or physical state. The physical state of the vehicle 102 can include various attributes as mentioned above, such as at least one of vehicle 102 speed, accelera- FIG. 3 illustrates an example traffic scene 300. Specifically the illustrated traffic scene 300 includes two roads 302 and an intersection 304 of the roads 302. The intersection 304 includes a traffic light 306 that can regulate the flow of traffic including vehicles 102 at and through the intersection 304. As a host vehicle 102 approaches (and then, although not seen in FIG. 3, then travels through), the intersection 304, localization data can help a localization computer 106 in the host vehicle 102 determine various vehicle 102 operations. For example, localization data can include a determination of a road 302 on which the vehicle 102 is traveling, a lane of the road 302 within which the vehicle 102 is traveling, as well as a location of the vehicle 102 relative to other objects, such as the traffic light 306, other vehicles 102, etc. As noted above, a boundary 308 or boundaries 308 can be defined for an area such as an intersection 304 to trigger localization data for one or more applications 212. For example, as the vehicle 102 of FIG. 3 approaches a boundary 308, the localization computer 106 in the vehicle 102 could determine a trigger for a TLI application 212.

Figure 4A:
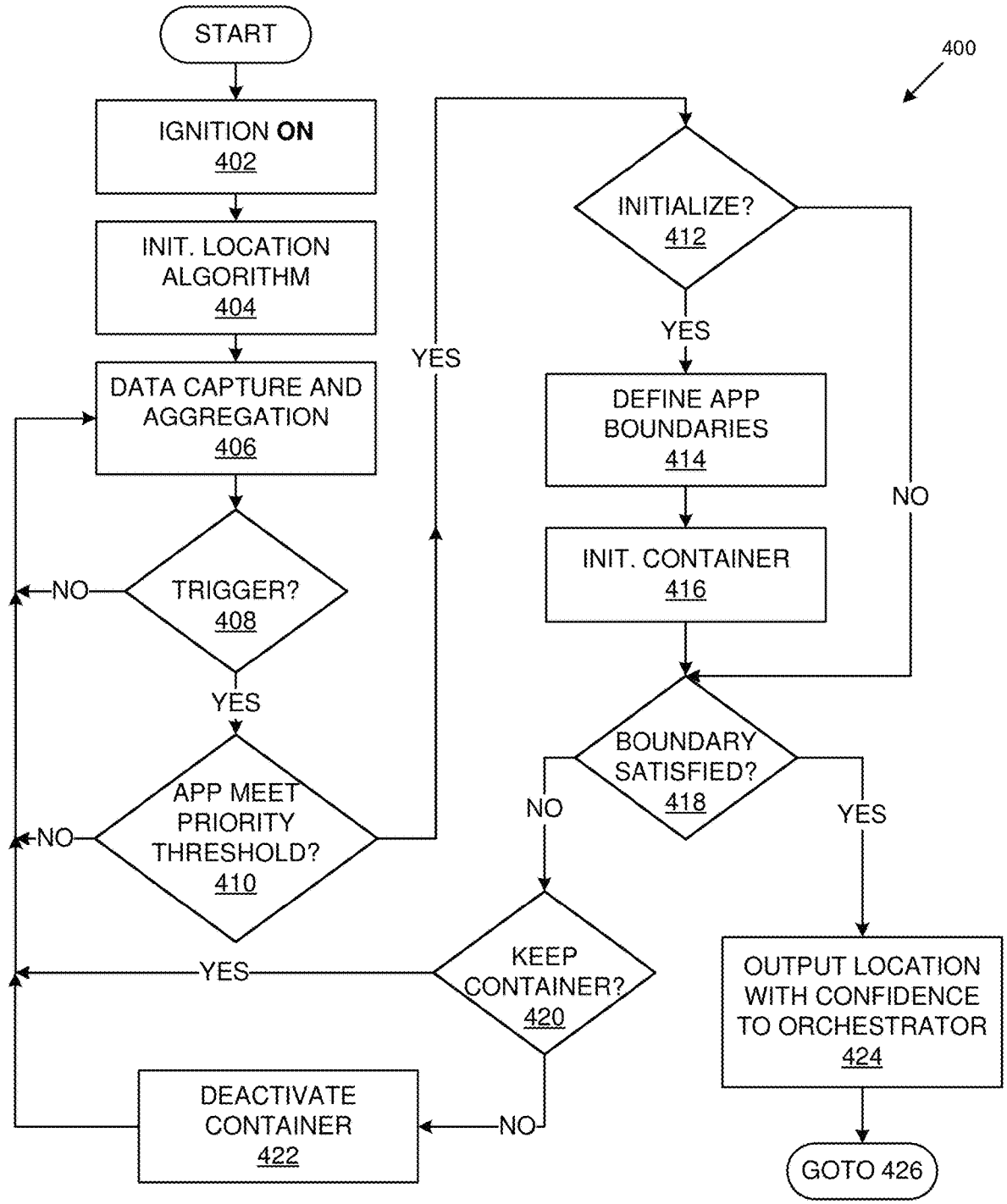
FIGS. 4A and 4B collectively illustrate an exemplary process for providing localization data in a vehicle.
Figure 4B:
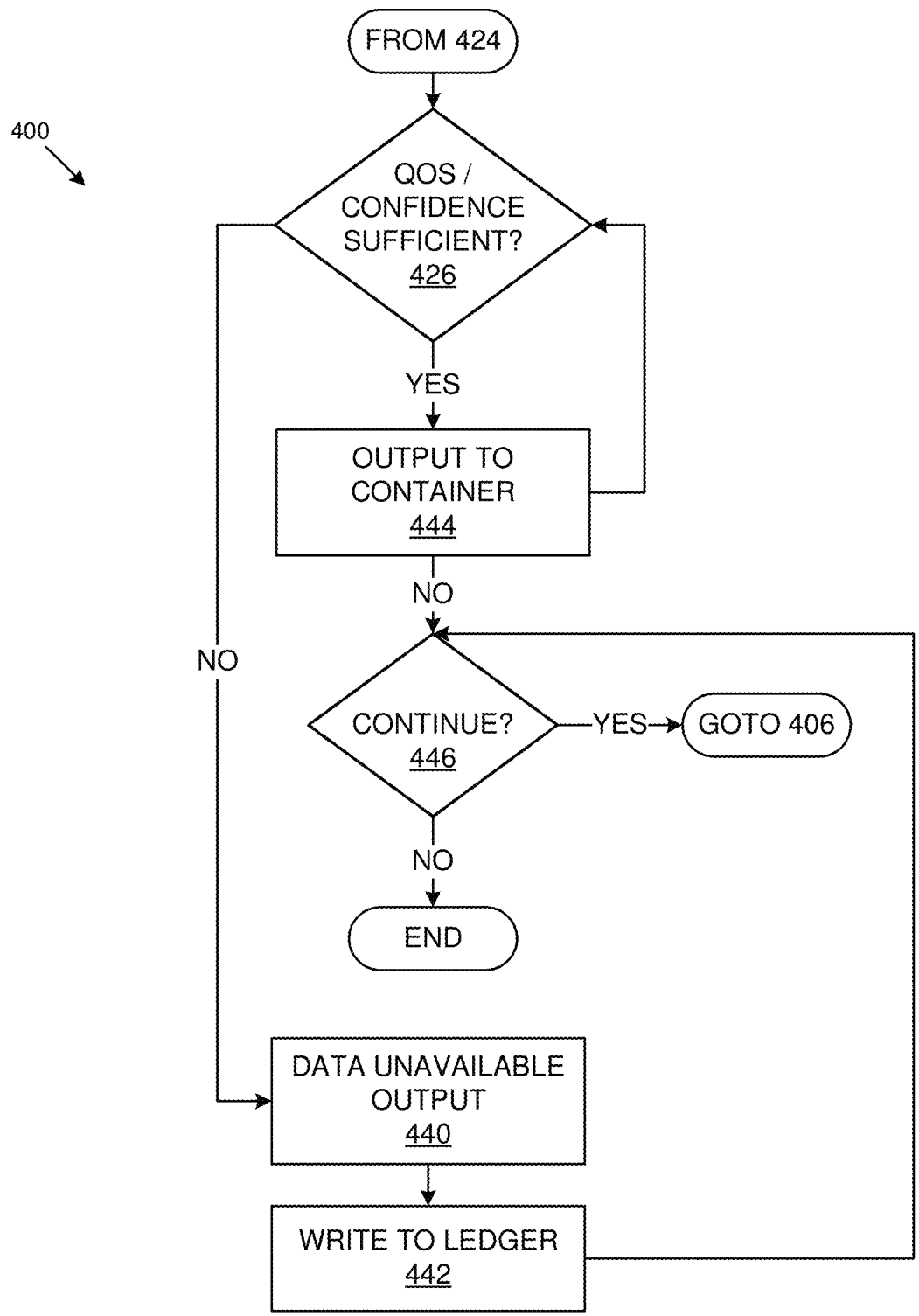

FIGS. 4A and 4B collectively illustrate an exemplary process 400 for providing localization data in a vehicle 102.

The process 400 can begin in a block 402, in which a vehicle 102 transitions from an ignition OFF state to an ignition ON state.

Next, in a block 404, caused by the localization computer 106 detecting the transition to the ignition on state, the localization computer 106 initializes the localization subsystem 200 by beginning execution of the primary localization algorithm 206. For example, as explained above, the primary localization algorithm 206 can dynamically compile program instructions to execute on an operating system 100 of the localization computer 106.

Next, in a block 406, as the vehicle 102 operates, e.g., travels over a roadway, remains parked and in the ignition ON state, etc., aggregators 204 included in the localization subsystem 200 capture and aggregate localization data as described above.

Next, in a block 408, the orchestrator 208 determines whether a trigger has been detected for an application 212 to receive localization data. As can be seen in FIGS. 4A and 4B, the process 400 can loop back to the block 406 and its succeeding blocks. Accordingly, it is possible that the process 400 could reach the block 408 after a trigger for an application 212 has been detected, and a container 210 has been instantiated and initialized and has provided and/or is providing localization data to the application 212. In this case, in the block 408 the orchestrator 208 can determine whether the trigger previously detected remains valid. For example, if a trigger for a TLI application 212 were a distance from an intersection 304 (or a boundary 308 around the intersection 304), the orchestrator 208 could determine whether the vehicle 102 was still within the distance from the intersection 304. In any case, if a trigger for the application 212 is detected, a block 410 is executed next. Otherwise, the process 400 returns to the block 406.

In the block 410, the orchestrator 208 determines whether the application 212 associated with the trigger of the block 408 meets a priority threshold, i.e., based on available resources for providing localization data to applications 212, whether the application 212 has sufficient priority over other applications 212 that may be requesting localization data. If available resources are sufficient for the container 210 to provide localization data to the triggered application 212, that the determination of the block 410 may be yes. Alternatively or additionally, if the triggered application 212 has a priority, e.g., determined as explained above and/or according to a lookup table or the like, higher than other triggered applications 212, then likewise the determination of the block 410 can be yes. If the application 212 does not have sufficient priority, the determination of the block 410 is now, and the process 400 proceeds back to the block 406. If the determination of the block 410 is yes, then a block 412 is executed next.

In the block 412, the orchestrator 208 determines whether a container 210 for the triggered application 212 of the block 408 needs to be instantiated and/or initialized. For example, a container 210 for the triggered application 212 could have been instantiated and/or initialized in a prior iteration of the process 400. If the container 210 does need to be initialized, then a block 414 is executed next. Otherwise, the process 400 proceeds to a block 418.

In the block 414, the orchestrator 208 determines boundaries 308, i.e., geographic locations, within or and/or beyond which the application 212 is to receive localization data. In some examples, the boundaries 308 for an application 212 may be undefined, i.e., the application 212 may be specified to receive localization data regardless of geographic location as long as the vehicle 102 ignition is in an on state. Typically, however, an application 212 receives localization data within a boundary 308 or boundaries 308 within which the application 212 can use the localization data. For example, a TLI application 212 may receive localization data within boundaries 308 determined according to a radius or square around an intersection 304. In another example, a lane-keeping application 212 could receive localization data when a vehicle 102 is on a multi lane road 302.

Next, in a block 416, the process 400 initializes the container 210 for the application 212 triggered in the block 408.

In the block 418, which may follow either of the block 412, 416, the orchestrator 208 determines whether the vehicle 102 is within boundaries 308 specified for the application 212 triggered in the block 408. If not, the process 400 proceeds to a block 420. If yes, the process 400 proceeds to a block 424.

In the block 420, which is reached when the boundary 308 for a triggered application 212 is not satisfied, i.e., the vehicle 102 is not within the boundary 308 to provide localization data to the application 212, the orchestrator 208 can determine whether to keep a container 210 that was instantiated to provide localization data to the application 212. In one example, the trigger may specify to generate a container 210 before a vehicle 102 is within a boundary 308 to provide localization data for an application 212, i.e., in anticipation or preparation of the vehicle 102 being within the boundary 308 within which the application 212 should receive localization data. In this example, the orchestrator 208 could determine to maintain the container 210 based on the vehicle 102 approaching an entry boundary 308 for the application 212 to receive localization data. On the other hand, if the vehicle 102 has passed an exit boundary 308 defining an area in which the application 212 should receive localization data, the orchestrator 208 may determine to deactivate the container 210. If the container 210 is to be maintained, then the process 400 proceeds from the block 420 back to the block 406. If the container 210 is to be deactivated, then the process 400 proceeds to a block 422.

In the block 422, the container 210 is deactivated. The process 400 then proceeds back to the block 406.

In the block 424, the localization algorithm 206 outputs localization data in response to an application 212 request along with a confidence level and a quality of service (QoS) level to the orchestrator 208. The process 400 and proceeds to a block 426.

In the block 426, the orchestrator 208 determines whether the quality of service and confidence levels are sufficient for the requesting application 212. If yes, the process 400 proceeds to a block 444. If not, the process 400 proceeds to a block 440.

In the block 440, the orchestrator 208 outputs a message, e.g., via the vehicle network 114, they can be received by the requesting application 212, that the requested data is unavailable. In some cases, a message may be displayed on a vehicle 102 HMI 108 that the requested data is unavailable.

Following the block 440, in a block 442, the orchestrator 208 can write to an electronic ledger such as a block chain as mentioned above data recording request from the application 212, a value for the localization data, and values for the quality of service and confidence levels. As noted above, electronic ledger can be distributed between one or more vehicles 102 and one or more remote computers such as the central server 118. Following the block 442, the process 400 proceeds to a block 446.

In a block 444, which may follow the block 426, the orchestrator 208 outputs localization data to a container 210 for the triggered application 212, which then receives the data. Localization data can then be used for the application 212 in vehicle 102 operations.

In a block 446, which may follow either of the blocks 442, 444, the localization subsystem 200 200 can determine whether to continue operations. For example, if a vehicle 102 ignition off signal or message is received on the vehicle network 114, the localization subsystem 200 200 can determine not to continue, and the process 400 ends. Absent such a determination not to continue, the process 400 returns to the block 406.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in response to, based on, and upon determining herein indicates a causal relationship, not merely a temporal relationship. The adjectives first and second are used throughout this document as identifiers and, unless explicitly stated otherwise, are not intended to signify importance, order, or quantity. The term exemplary is used herein in the sense of signifying an example, e.g., a reference to an exemplary widget should be read as simply referring to an example of a widget.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

APPENDIX—V2X MESSAGES

MAP: The MapData message is used to convey many types of geographic road information. For example, presently, its primary use is to convey one or more intersection lane geometry maps within a single message. The map message content includes such items as complex intersection descriptions, road segment descriptions, high speed curve outlines (used in curve messages), and segments of roadway (used in some applications). A given single MapData message may convey descriptions of one or more geographic areas or intersections.

SPaT: The signal phase and timing (SPaT) message provides a current status of one or more signalized intersections. The SPaT message sends a current movement state (e.g., light signal states) of each active phase in the system as needed (such as values of what states are active and values at what time a state has begun/does begin earliest, is expected to begin most likely and will end latest).

TIM: The traveler information message (TIM) is used to send various types of information (advisory and road sign types) to equipped devices. It makes heavy use of the ITIS (International Traveler Information Systems) encoding system (see Society of Automotive Engineers Standard SAE J2540) to send well known phrases, but allows limited text for local place names. The supported message types specify several sub-dialects of ITIS phrase patterns to further reduce the number of octets to be sent. The expressed messages are active at a precise start and duration period, which can be specified to a resolution of a minute.

RTCM: The RTCM Corrections message is used to encapsulate RTCM differential corrections for GPS and other radio navigation signals as defined by the RTCM (Radio Technical Commission for Maritime Services) special committee number 104 in its various standards. These messages are "wrapped" for transport on V2X media, and then can be re-constructed back into the final expected formats defined by the RTCM standard and used directly by various positioning systems to increase the absolute and relative accuracy estimates produced.

WSA: Wireless Access in Vehicular Environments (WAVE) Service Advertisement (WSA) is a data structure that include the announcement of the availability of higher layer services example, RTCM, MAP, SPaT etc.

SSM: The signal status message (SSM) is a message sent by an RSU in a signalized intersection. It is used to relate the current status of the signal and the collection of pending or active preemption or priority requests acknowledged by a controller. It is also used to send information about preemption or priority requests which were denied. This in turn allows a dialog acknowledgment mechanism between any requester and the signal controller. The data contained in this message allows other users to determine their "ranking" for any request they have made as well as to see the currently active events. When there have been no recently received requests for service messages, this message may not be sent. While the outcome of all pending requests to a signal can be found in the signal status message, the current active event (if any) will be reflected in the SPAT message contents.

BSM: The basic safety message (BSM) can be used in a variety of applications to exchange data regarding vehicle state. This message is broadcast frequently to surrounding vehicles with data content as required by applications.

EVA: The emergency vehicle alert (EVA) message is used to broadcast warning messages to surrounding vehicles that an emergency vehicle (typically an incident responder of some type) is operating in the vicinity and that additional caution is required. The message itself is built on the original ATIS roadside alert message which in turn uses the common ITIS phrase list to both describe the event and provide advice and recommendation for travelers. The emergency vehicle alert message appends to the message some additional data elements regarding the overall type of vehicle involved and other useful data. Note that this message can be used by both private and public response vehicles, and that the relative priority of each (as well as security certificates) is determined in the application layer.

PSM: The Personal Safety Message (PSM) is used to broadcast data regarding the kinematic state of various types of Vulnerable Road Users (VRU), such as pedestrians, cyclists, or road workers.

The invention claimed is:

1. A system for a vehicle, comprising:
   a network interface connectable to a vehicle network; and
   a processor and a memory, the memory storing instructions executable by the processor, including instructions to:
   identify a plurality of localization data sources accessible on the vehicle network;
   identify a plurality of active vehicle applications that request localization data provided by one or more of the localization data sources; and
   select, based on the active vehicle applications, a plurality of the localization data sources to be combined to output a vehicle location;
   wherein the instructions to select one or more of the localization data sources include selecting the localization data sources output from a machine learning program that receives as input identifiers for (a) the localization data sources accessible on the vehicle network, and (b) the active applications that request the localization data;
   wherein the machine learning program is trained with previously collected localization data from the localization data sources.

2. The system of claim 1, wherein respective ones of the localization data sources belong to one of a plurality of types of localization data sources.

3. The system of claim 2, wherein the types of localization data sources include two or more of map data, V2X data, vehicle sensor data, or vehicle location data.

4. The system of claim 2, wherein the instructions further include instructions to combine the localization data according to the types of localization data sources.

5. The system of claim 4, wherein the instructions further include instructions to perform a data fusion procedure that receives the combined localization data as input and that outputs the vehicle location.

6. The system of claim 1, wherein the instructions further include instructions to perform an initialization routine upon an ignition-ON signal on the vehicle network, wherein the initialization routine includes compiling instructions to allow the system to request and receive data from the selected localization data sources.

7. The system of claim 6, wherein the instructions further include instructions to identify a minimum number of localization data sources needed for the initialization routine.

8. The system of claim 1, wherein the instructions further include instructions to assign an application priority to respective active vehicle applications based on a vehicle operation that utilizes the respective active vehicle application.

9. The system of claim 8, wherein the instructions further include instructions to assign data source priorities to respective localization data sources based on the application priority or priorities of one or more active vehicle applications requiring the respective localization data source.

10. The system of claim 1, wherein the active vehicle applications include at least one of a vehicle human-machine interface (HMI), an Emergency Electronic Brake Light (EEBL), Green Light Optimal Speed Advisory (GLOSA), Global Location Number (GLN), cruise control, lane-keeping assistant, path planning, a toll payment, traffic light 306 information, parking, electric vehicle charging, or collision avoidance.

11. The system of claim 1, wherein the instructions further include instructions to provide an identification of at least one of the active vehicle applications to a human machine interface (HMI) in the vehicle.

12. A method, comprising:
   identifying a plurality of localization data sources accessible on a vehicle network in a vehicle;
   identifying a plurality of active vehicle applications that request localization data provided by one or more of the localization data sources;
   selecting, based on the active vehicle applications, a plurality of the localization data sources to be combined to output a vehicle location, the localization data sources being output from a machine learning program that receives as input identifiers for (a) the localization data sources accessible on the vehicle network, and (b) the active applications that request the localization data; and
   training the machine learning program with previously collected localization data from the localization data sources.

13. The method of claim 12, wherein respective ones of the localization data sources belong to one of a plurality of types of localization data sources.

14. The method of claim 13, wherein the types of localization data sources include two or more of map data, V2X data, vehicle sensor data, or vehicle location data.

15. The method of claim 13, further comprising combining the localization data according to the types of localization data sources.

16. The method of claim 13, further comprising performing a data fusion procedure that receives the combined localization data as input and that outputs the vehicle location.

17. The method of claim 12, further comprising assigning an application priority to respective active vehicle applications based on a vehicle operation that utilizes the respective active vehicle application.

18. The method of claim 17, wherein assigning data source priorities to respective localization data sources is done based on the application priority or priorities of one or more active vehicle applications requiring the respective localization data source.

* * * * *